May 26, 1964 E. J. SCHAEFER 3,134,469
DRIVE UNIT CONTROL SYSTEM
Filed Oct. 10, 1960 4 Sheets-Sheet 2

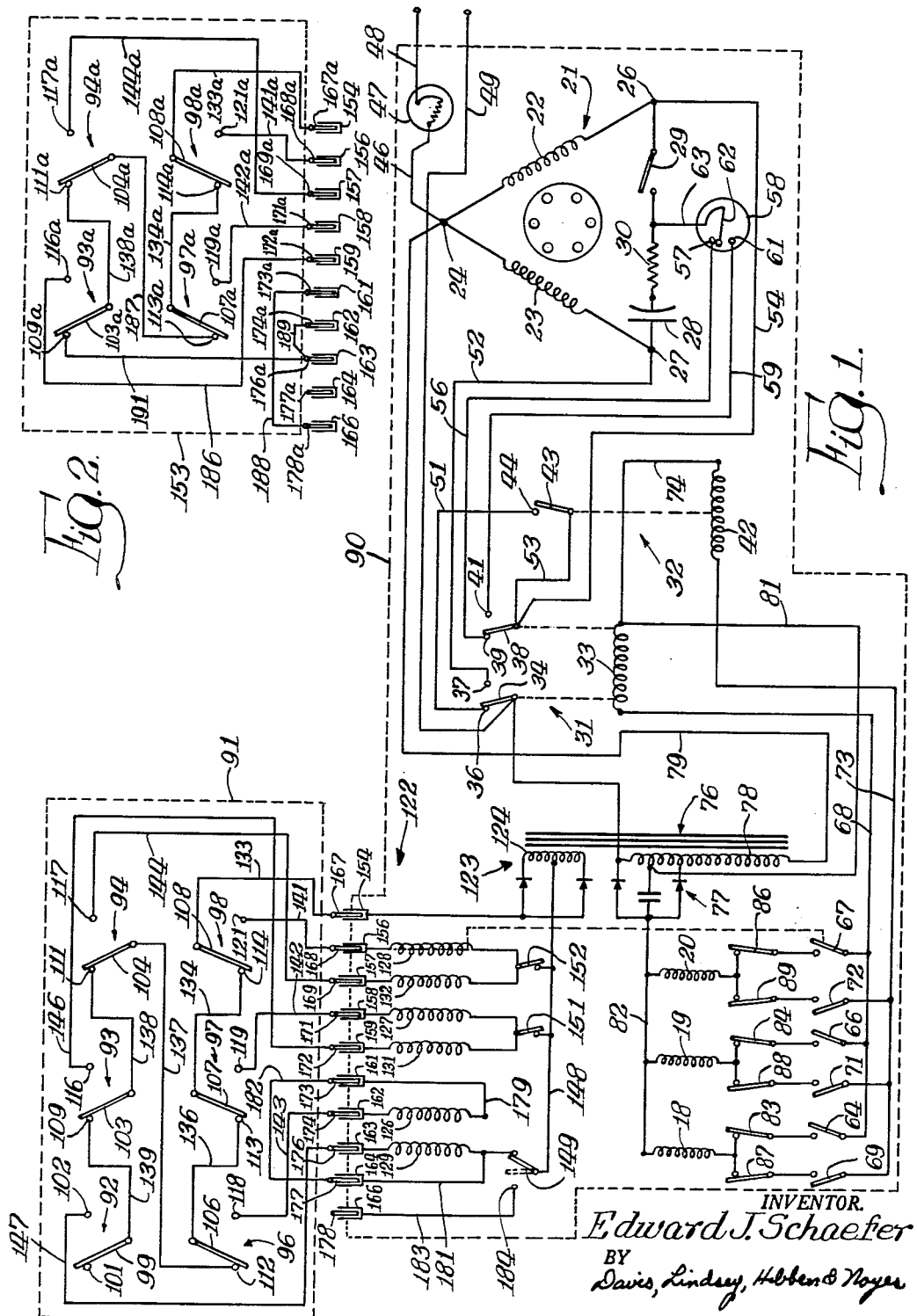

INVENTOR.
Edward J. Schaefer,
BY
Davis, Lindsey, Hibben & Noyes
Attys.

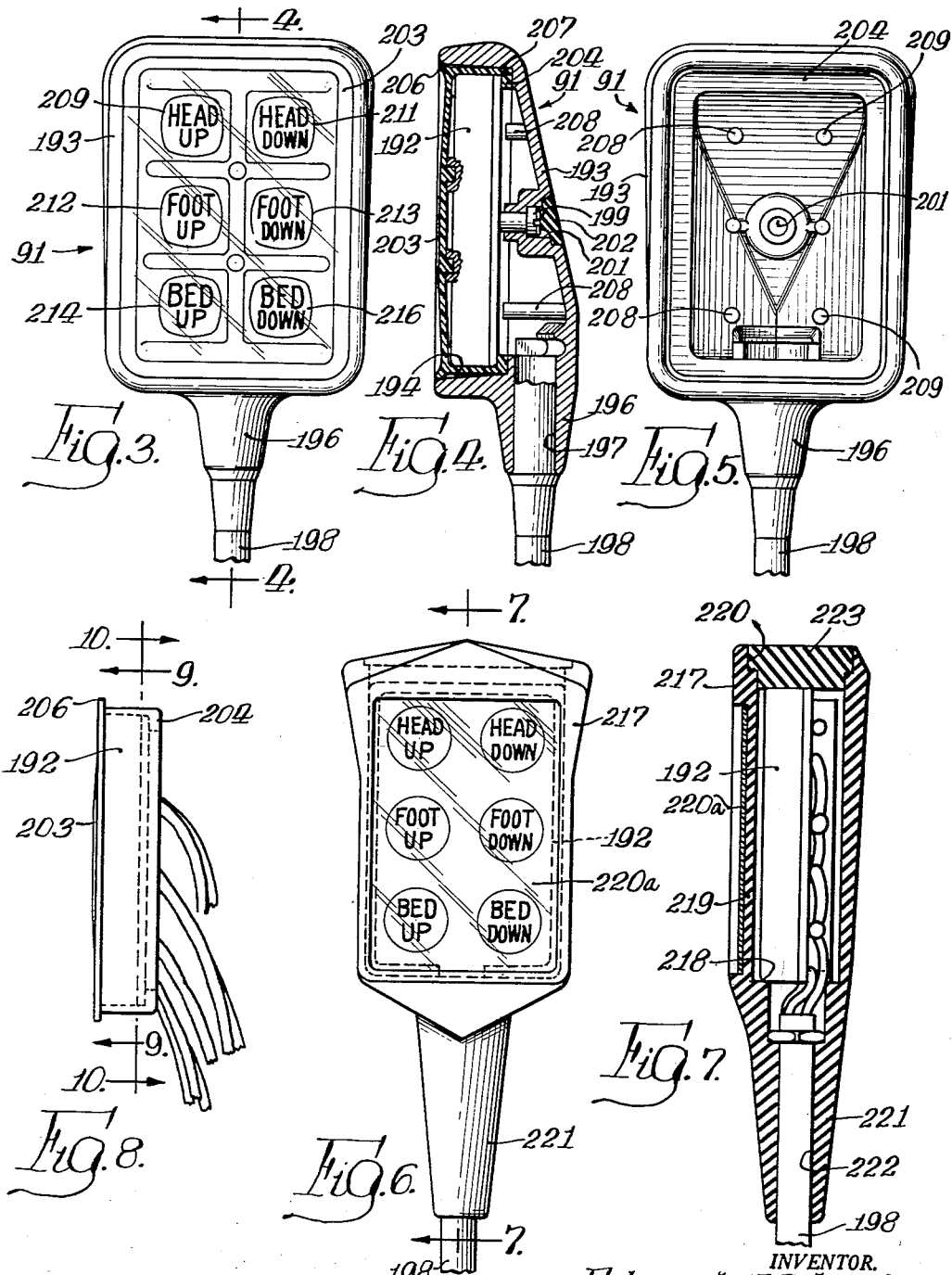

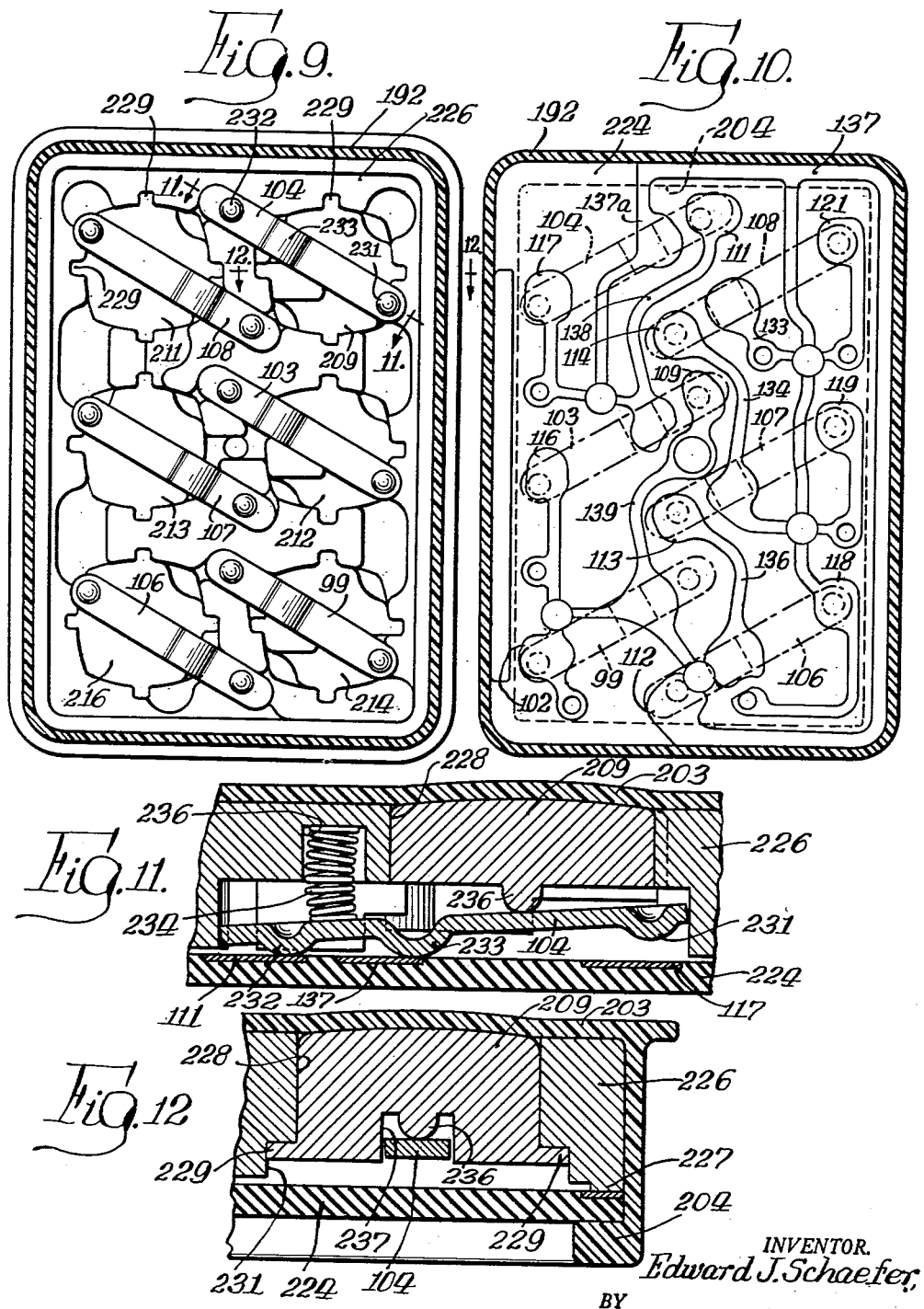

United States Patent Office 3,134,469
Patented May 26, 1964

3,134,469
DRIVE UNIT CONTROL SYSTEM
Edward J. Schaefer, Bluffton, Ind., assignor to Franklin Electric Co., Inc., Bluffton, Ind., a corporation of Indiana
Filed Oct. 10, 1960, Ser. No. 61,758
38 Claims. (Cl. 192—.02)

This invention relates to controls for drive units and more particularly to a novel electrical control system.

In my copending application for patent titled Drive Unit and Control, Serial No. 796,160, filed February 27, 1959, now abandoned, I have disclosed a drive unit and control that is adapted for use in connection with hospital beds. The drive unit therein disclosed comprises a single reversible electric motor that is selectively connectable by a plurality of clutches to a plurality of shafts for driving different mechanisms in a hospital bed, such as one for raising the head, one for raising the foot, and one for raising the bed as a whole. The control system in that unit includes a portable handle that is mechanical in character and is connected by a Bowden wire to switch apparatus located at the drive unit. The handle may be manipulated by a patient, while occupying the bed, to control the drive unit and thus the different mechanisms of the bed. The present invention is directed to an improved form of control system for such a drive unit. However, it will be recognized, from the description that follows, that the novel features disclosed herein are equally applicable to control systems for other forms of drive units and for use in other environments.

It is a primary object of the present invention to provide a novel drive unit control apparatus that is safe to use, is dependable and requires little effort to manipulate.

A further object is to provide a novel drive unit control apparatus having a controller or handle which contains switches but which can be safely used in environments in which an electrical spark at such controller handle might cause combustion.

Another object is to provide a novel drive unit control apparatus that can be quickly and easily modified, by simply interchanging one of a set of controllers or handles for another of the set, to provide different control arrangements.

A further object is to provide a novel drive unit control apparatus having a controller or handle which contains electric switches and which is arranged for sterilization by immersion in a liquid bath or the like.

Still another object is to provide a novel form of portable controller, or handle, for control apparatus of the foregoing character.

Other objects and advantages of the invention will be apparent from the following description taken in conjunction with the accompanying drawing wherein:

FIG. 1 is a circuit diagram of a drive unit control apparatus, including one controller or handle therefor, embodying features of the present invention;

FIG. 2 is a circuit diagram of another controller or handle that can be substituted for the controller or handle shown in FIG. 1;

FIG. 3 is a front view of one form of the controller or handle that is included in FIG. 1;

FIG. 4 is a sectional view taken along the line 4—4 in FIG. 3;

FIG. 5 is a back view of the control handle shown in FIG. 3;

FIG. 6 is a front view of another form of controller or handle;

FIG. 7 is a sectional view taken along line 7—7 in FIG. 6;

FIG. 8 is a side view of a switch assembly contained in the controller handles shown in FIGS. 3 and 6;

FIG. 9 is an enlarged sectional view taken along line 9—9 in FIG. 8;

FIG. 10 is an enlarged sectional view taken along line 10—10 in FIG. 8;

FIG. 11 is a sectional view, still further enlarged, taken along line 11—11 in FIG. 9; and FIG. 12 is a sectional view, still further enlarged, taken along line 12—12 in FIG. 9.

Figure 1A:
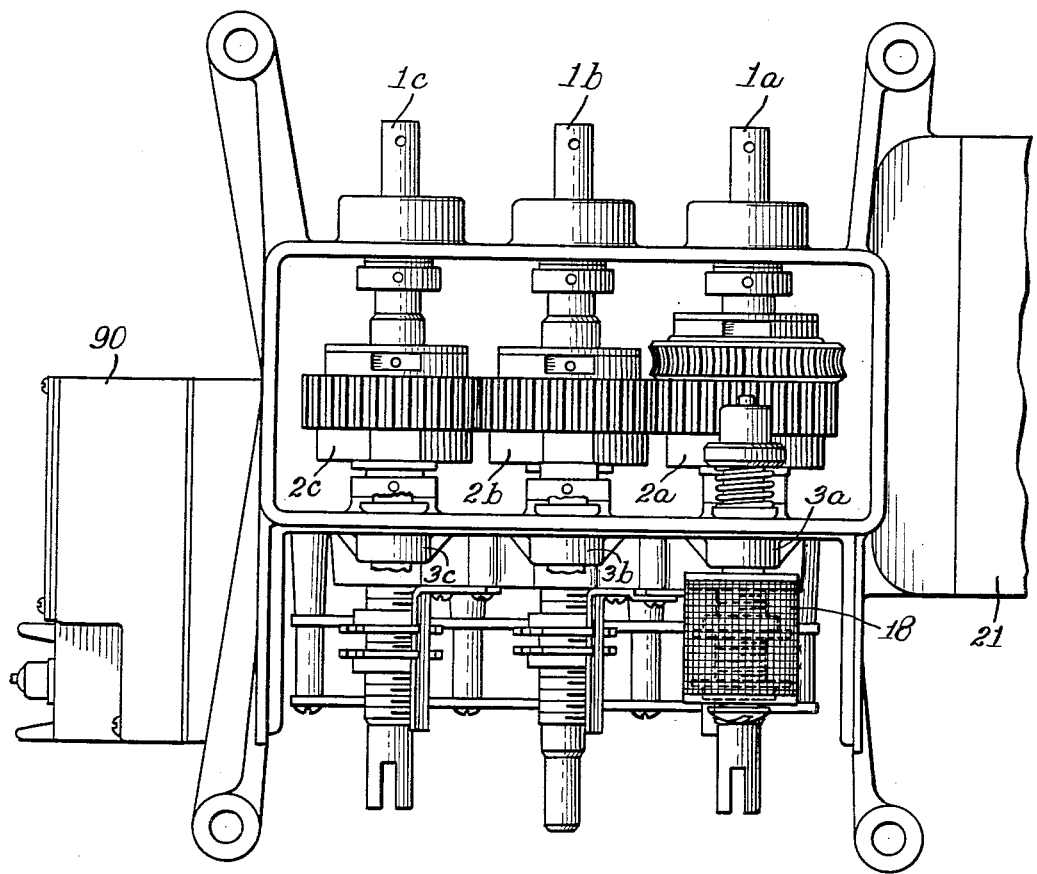
FIG. 1a is a top plan view showing some of the internal mechanism of the drive unit of FIG. 1.

The present invention is an improved form of control apparatus for a drive unit such as is illustrated and described in my above-mentioned copending application, to which reference may be made for a full description of the drive unit. That drive unit comprises a single reversible electric motor that can be selectively connected to any one of three driven shafts by three clutches. These shafts are connectable respectively to three mechanisms for raising and lowering two separate parts of the hospital bed and the entire bed. Engagement and disengagement of the clutches is effected by associated electrical clutch actuators. The drive unit also includes electrical means for operating the motor selectively in forward and reverse directions and limit switch devices, associated with the three shafts, connected to stop the motor when any one of the raising mechanisms has been operated to a predetermined limit in either direction.

The objects of the present invention are accomplished by providing an improved electrical form of control apparatus for a drive unit of the foregoing character. More specifically, the present apparatus includes, in addition to the electrical clutch actuators and electrical motor connecting means mentioned above, a controller device, containing manual switches, adapted to be remotely positioned from the remainder of the apparatus. The apparatus also includes means, interposed between the controller device and the electrical apparatus, the clutch actuators and motor connecting means, for effecting energization of the clutch actuators and the motor connecting means in response to manual manipulation of the controller switches.

When such drive unit is used in connection with a hospital bed, the controller device will be located so that a patient while lying in bed can readily operate the drive mechanism. Hence, the controller device is preferably in the form of a handle that contains the manual electrical switches so that they can be manipulated by the patient to effect the desired operation of the drive unit. Being electrical in form, the controller device or handle can be a small, light structure that requires little effort to manipulate.

Inasmuch as the controller device or handle is available for operation by the patient, on occasion it may be exposed to an atmosphere containing a high concentration of oxygen or other gas that increases the danger of combustion. Thus, it can be seen that arcing or sparking in such an atmosphere could result in a distinct fire hazard. To avoid such hazard, the present system is provided with a main circuit, in which the motor, the clutch actuators and the motor connecting means are connected, and a second low power control circuit in which the switches in the controller device or handle are connected. The control circuit is isolated from the main circuit and carries a small current at low voltage to prevent arcing or sparking at the switches in the controller or handle upon opening and closing thereof. Moreover, the controller or handle is of a form which includes a sealed container for the manual switches as further insurance against causing combustion and so that the controller or handle can be easily sterilized by immersion in a liquid sterilizing bath without danger of creating a short circuit in the handle.

To simplify its construction and sealing, the handle is provided with a novel printed circuit that forms fixed contacts for the manually operated switches. Pushbuttons in the handle effect operation of such switches, the pushbuttons being operated by pressure exerted on a thin flexible wall formed or provided as part of the handle casing.

As pointed out in the above mentioned copending application, it is frequently important for medical reasons that the patient be prevented from operating certain parts of the bed. The present invention provides a novel arrangement for preventing such operation by providing a set of interchangeable controller devices or handles for the control apparatus. One handle allows an operator to have full control of the drive unit while the other handle gives control of only parts of the drive unit. Either handle can be freely substituted for the other without involved circuit changes, the circuits of the handles incorporating the changes necessary for simple substitution.

FIG. 1 of the drawing diagrammatically illustrates parts of a drive unit, similar to the one illustrated in the above mentioned copending application, but associated with control apparatus embodying the features of the present invention. The drive unit parts illustrated in FIGS. 1 and 1a include three driven shafts 1a, 1b, and 1c which are selectively connectible by clutch means including clutches 2a, 2b and 2c to an electric motor 21. The clutches 2a, 2b and 2c include three solenoid coils 18, 19 and 20 of three electrically operated clutch actuators 3a, 3b and 3c respectively (3b and 3c being shown only fragmentarily in FIG. 1a). The mechanical features of the clutch actuators and their associated clutches are shown and described fully in the said copending application.

In the present instance, the motor 21 is shown as a single phase capacitor start motor having a pair of field windings 22 and 23. The windings 22 and 23 are interconnected at one end at a terminal 24. At their opposite ends, the windings 22 and 23 are respectively connected to terminals 26 and 27 which in turn are interconnected through a capacitor 28, a resistance 30 and a centrifugal switch 29. The centrifugal switch 29, of course, is normally closed, but opens when the motor attains a predetermined operated speed. The windings 22 and 23 are displaced 90° in the usual manner and are identical so that the motor can be selectively connected for operation in either the forward or reverse direction.

The present control apparatus includes means for selectively connecting the motor windings 22 and 23 for forward and reverse operation of the motor. Thus, the connecting means comprises a pair of switches provided by a pair of relays indicated generally at 31 and 32. The relay 31 has an actuating coil 33, and a switch constituting one of said pair of switches and comprising a movable contact 34 that normally engages fixed contact 36 but is shiftable into engagement with a second fixed contact 37. The coil 33, when energized, effects engagement of the movable contact 34 with fixed contact 37 and connects the motor for operation in one direction, for example, the down or reverse direction of any one of the drive mechanisms. The relay 32 provides the other of said pair of switches which comprises a movable contact 43 and a fixed contact 44. The movable contact 43 is shifted into engagement with the fixed contact 44 upon energization of a relay coil 42 of the relay 32. Engagement of the contact 43 with the contact 44, when the motor is stopped, connects the motor for operation in the opposite direction, for example, the up or forward direction of any one of the drive mechanisms.

The control systems also includes means for instantly changing the direction of motor operation. Such means is generally of the character shown in Patent No. 2,847,629, issued August 12, 1958. To this end the relay 31 has a second movable contact 38 that normally engages a fixed contact 39 and is shiftable, upon energization of coil 33, into engagement with a fixed contact 41. Also, the motor is provided with a rotation sensing switch 58 that is connected to cooperate with the above described switches in relays 31 and 32 to provide shunt connections around the centrifugal switch 29 when the latter is open and it is desired to change the direction of motor operation. In other words, the various contacts of the relays 31 and 32 and the rotation sensing switch 58 are connected in a main circuit with the motor field winding 22 and 23. Thus, the terminal 24 of the motor is connected by a conductor 46 through an overload protector 47 to one conductor 48 of a power line. The other conductor 49 of the power line is connected to the movable contact 34 of the relay 31. The fixed contact 36 of relay 31 is connected by a conductor 51 to fixed contact 44 of relay 32 and fixed contact 37 of the relay 31 is connected by a conductor 52 to the terminal 27 of the motor. Also, the movable contact 38 is connected by a conductor 53 to the movable contact 43 of the relay 32 and is also connected by a conductor 54 to the terminal 26 of the motor. The fixed contact 39 is connected by a conductor 56 to a fixed contact 57 in the rotation sensing switch 58 and the fixed contact 41 in the relay 31 is connected by a conductor 59 to another fixed contact 61 in the rotation sensing switch 58. The rotation sensing switch 58 has a movable contact 62 that is connected by a conductor 63 to the side of the centrifugal switch 29 opposite from the motor terminal 26. The movable contact 62 of the rotation sensing switch 58 engages the fixed contact 58, as shown in FIG. 1 when the motor is operating in the down or reverse direction and when the motor is operating in the up or forward direction, the movable contact 62 engages the fixed contact 61.

In the present system the solenoid coils 18, 19 and 20 are connected in a branch of the main motor circuit and are arranged to cooperate with the motor connecting means, relays 31 and 32, and the rotation sensing switch 58, to simultaneously actuate a selected clutch when the motor is connected for operation in a selected direction. For this purpose, the coils 18, 19 and 20 are respectively connected at one end, through other elements described hereinafter, to one end of the relay coil 33 by a conductor 68. The coils 18, 19 and 20 are also respectively connected at the one end, through still other elements to be described hereinafter, to one end of the relay coil 42 by a conductor 73. The opposite ends of the relay coils 33 and 42 are interconnected by a conductor 74.

The branch of the main circuit containing the solenoid coils 18, 19 and 20 and the relays 31 and 32 is provided with direct current developed from the power line by an auto-transformer 76 and a rectifier 77. The auto-transformer has a main winding 78 connected at one end to the motor terminal 24 by a conductor 79 and connected at its other end to the movable contact 34 of the relay 31. Thus, the transformer winding 78 is connected in parallel with the motor windings 22 and 23. A conductor 81 connects the interconnected ends of coils 33 and 42 to the positive terminal of the rectifier 77 and another conductor 82 connects the solenoid coils 18, 19 and 20 to the negative terminal of the rectifier 77. In the present system the auto-transformer provides a direct current of .5 of an ampere at 18 volts.

A drive unit, such as is shown in the above mentioned copending application preferably has each of its three driven shafts provided with a pair of limit switches. Thus, there are six limit switches in all which are represented in FIG. 1 by normally closed switches 83, 84, 86, 87, 88 and 89. Switches 83, 84 and 86 are down or reverse limit switches, that are opened when their associated shafts have rotated a predetermined amount in the reverse direction, and are respectively connected in series with the coils 18, 19 and 20. Switches 87, 88 and 89 are up or forward limit switches, that are opened when their associated shafts have rotated a predetermined amount in the forward direction, and are respectively connected in parallel with limit switches 83, 84 and 86 and in series with the coils 18, 19 and 20. In other words, the limit switches are arranged in parallel pairs.

All of the elements of the system thus far described are preferably located adjacent the drive unit which, in the case of a hospital bed drive unit, may be located near the foot of such bed. Moreover these elements are preferably enclosed in a housing 90, indicated by dotted lines in FIG. 1, such as is shown in my said copending application. Hence, even though some arcing or sparking may occur upon the opening and closing of the various contacts above described, there is little likelihood of danger.

For controlling the unit from a remote location, the system is provided with a portable controller or handle (which will be described in more detail hereinafter) indicated generally at 91 by the broken lines. The handle 91 contains, in this instance, six manual switches 92, 93, 94, 96, 97, and 98 arranged to selectively control the energization of the three solenoids 18, 19 and 20 and at the same time to selectively control the energization of the relays 31 and 32 to cause the motor to operate forwardly or reversely. The switches 92, 93 and 94 are up or forward switches and the switches 96, 97 and 98 are down or reverse switches.

Each of the switches has a movable contact that normally engages a fixed contact and is shiftable into engagement with a second fixed contact. Thus, switch 92 has a movable contact 99 that normally engages a fixed contact 101 but is shiftable into engagement with a second fixed contact 102. Likewise, switches 93, 94, 96, 97 and 98 have, respectively, movable contacts 103, 104, 106, 107 and 108 that normally engage respectively fixed contacts 109, 111, 112, 113 and 114, but are individually shiftable into engagement with fixed contacts 116, 117, 118, 119 and 121 respectively.

While it is possible to operate the control by connecting the manual switches 92, 93, 94, 96, 97 and 98 directly in the main circuit in series with the solenoids 18, 19 and 20, when thus arranged the manual switches would carry the full current passing through the solenoids and would be likely to spark or arc upon opening and closing of the switches. An important feature of the invention resides in a circuit arrangement that eliminates or suppresses such tendency to arc. To this end the manual switches are connected in a low power control circuit, indicated generally at 122, that is electrically separated or isolated from the previously described main circuit. In addition to the manual switches 92, 93, 94, 96, 97 and 98, the control circuit includes a power source 123 and isolating means, having portions also connected in the main circuit, for selectively effecting energization of the solenoids 18, 19 and 20 and, at the same time, for selectively effecting energization of the motor connecting relays 31 and 32, in response to operation of the manual switches.

The power source 123 for the control circuit comprises a transformer winding 124, coupled as shown to the core of the auto transformer 76, and a pair of diodes arranged in the manner shown to form a rectifier and thus provide direct current for the control circuit. In the present system, when the conductors 48 and 49 are connected to a 115 volt source, the power source 123 provides the control circuit with .013 of an ampere at 14 volts.

There are several devices capable of performing as the above mentioned isolating means in a low power control circuit. For example, transistors can be connected in several ways to respond to the opening and closing of the control switches 92, 93, 94, 96, 97 and 98 and effect energization of the motor connecting relays. However, the present system is provided with sensitive relays as the isolating means. In the system shown in FIG. 1 there are six such relays, represented by their coils 126, 127, 128, 129, 131 and 132, and normally open relay switches 64, 66, 67 69, 71 and 72 respectively, associated with the coils. The relay switches 64, 66 and 67 are reverse or down switches and are respectively connected between solenoid coils 18, 19 and 20 and the conductor 68. The relay switches 69, 71 and 72 are forward or up switches and are respectively connected between solenoid coils 18, 19 and 20 and the conductor 73. These relay switches are, of course, closed when their respective coils are energized and the coils are sufficiently sensitive to be energized by the low power current in the control circuit.

In the environment of a hospital bed it is important that only one of the drives be operated at any time and that only one direction of motor operation be called for at one time. To this end the manual switches in the control circuit are electrically interlocked. Thus, the negative terminal of the power source 123 is connected by a conductor 133 to the movable contact 108 of switch 98. The fixed contact 114 of switch 98 is connected by a conductor 134 to the movable contact 107 of switch 97. In similar fashion the fixed contacts 113, 112, 111 and 109, which are normally engaged respectively by movable contacts 107, 106, 104 and 103, are respectively connected by conductors 136, 137, 138 and 139 to the movable contacts 106, 104, 103 and 99. The fixed contact 101, normally engaged by the movable contact 99, is an open contact. In this way, the shifting of any switch will break the connection to any switch following it.

The other fixed contacts of the manual switches in the handle 91 are respectively connected to the coils of associated isolating relays. Thus, contact 121 of switch 98 is connected by a conductor 141 to one end of the relay coil 128. Likewise, fixed contacts 119, 118, 117, 116 and 102 are respectively connected by conductors 142, 143, 144, 146 and 147 to one end of relay coils 127, 126, 132, 131 and 129. The opposite ends of these relay coils are connected to the positive terminal of the power source 123 by a conductor 148.

The isolating relays are arranged in pairs corresponding to the clutch actuator solenoids 18, 19 and 20. Thus, the relays having coils 129 and 126 are associated with the solenoid having the coil 18, which in this instance is the clutch actuator for raising or lowering the bed as a whole. Likewise, the relays having coils 131 and 127 are associated with the solenoid having the coil 19, which is the clutch actuator for raising or lowering the foot of the bed, and the relays having coils 132 and 128 are associated with the solenoid having the coil 20, which is the clutch actuator for raising or lowering the head of the bed. From the preceding description it can be seen that energization of any one of the isolating relays will effect energization of its associated solenoid coil and one of the motor relays 31 or 32.

It is frequently desirable to prevent a patient from operating certain of the bed mechanisms and the present system has switch means for selectively eliminating the associated isolating relays from the control circuit. The pair of relays 129 and 126 are provided with a toggle switch 149 that is connected in series with both relay coils and to the conductor 148. Likewise, the pair of isolating relays having coils 131 and 127 are connected to the conductor 148 by a toggle switch 151 and the pair of isolating relays having coils 132 and 128 are connected to the conductor 148 by a toggle switch 152. When the toggle switches are closed, their associated relays can be energized by closure of their associated manual switches in the controller or handle 91. However, when the toggle switch has been opened, its associated relay coils are, in effect, eliminated from the control circuit.

In the present control system the power source 123, the relays having coils 129, 126, 131, 127, 132 and 128 and the toggle switches 149, 151 and 152 are all located at the drive unit housing, previously mentioned. The manual switches 92, 93, 94, 96, 97 and 98 are adapted to be located remotely from the drive unit and in the controller casing or handle 91. These two portions of the control circuit are interconnected by the above discussed conductors, portions of which are in the form of a flexible cable 198 (see FIG. 3).

Another important feature of the present invention resides in making the controller or handle 91 so that it may be freely exchanged for another handle or controller that provides a different control arrangement. Such different arrangement of the control circuit is accomplished, in effect, automatically by merely exchanging one handle for the other. FIG. 2, for example, illustrates a second form of handle 153 that can be freely substituted for the handle or controller 91 shown in FIG. 1. The conductors that interconnect the two portions of the control circuit are provided with separable connector parts, one connector part being mounted in fixed relation at the drive unit and a mating connector part being attached to the end of the cable, such as 198, extending from the controller or handle, such as 91. Likewise the controller or handle 153, shown in FIG. 2, is provided with a cable and a connector part identical to that provided for the handle or controller 91. The specific forms of the connector parts are not shown since such connector parts are readily available and are well known in the art. For the system illustrated, connector parts having ten interconnecting terminals are satisfactory.

The connector part for the portion of the control circuit located at the drive unit is, in this instance, a female plug having ten terminals 154, 156, 157, 158, 159, 161, 162, 163, 164 and 166. The connector part attached to the cable 198 extending from the controller handle 91 is a male plug having ten prongs 167, 168, 169, 171, 172, 173, 174, 176, 177 and 178 that respectively interfit in the terminals 154, 156, 157, 158, 159, 161, 162, 163, 164 and 166. The interfitted connector terminals 154 and 167 interconnect portions of the conductor 133. Likewise, the interfitted connector terminals 156 and 168, 157 and 169, 158 and 171, 159 and 172, 162 and 174 and 163 and 176 respectively interconnect portions of the conductors 141, 144, 142, 146, 143 and 147. The terminals 161 and 164 in the female connector part are respectively connected by conductors 179 and 181 to the ends of relay coils 126 and 129 opposite the latter's connections to terminals 162 and 163. The terminals 173 and 177 in the male connector part, which cooperate with the female terminals 161 and 164, are interconnected by a conductor 182. Also, the female terminal 166 is connected by a conductor 183 to a fixed contact 184 and the toggle switch 149, while the cooperating male terminal 178 is open. The connections provided by the terminal 166, the conductor 183 and the fixed contact 184 are not used with the controller or handle 91 but are used when the controller or handle 153 is substituted in place of the handle or controller 91 as will be shown hereinafter.

The arrangement of the controller or handle 153 is much like that of the controller or handle 91. However, the handle 153 contains only four switches that are arranged to control only the foot and head solenoids 19 and 20. In other words, when the handle 153 is substituted for the handle 91, a patient cannot control the height of the bed. Of course, the handle 153 is merely one of many possible variations that may be used. Inasmuch as the two handles shown are much alike, the elements in the handle 153 that correspond to elements in the handle 91 have been given the same reference numbers and a subscript $a$. Thus, handle 153 includes four manual switches 93$a$, 94$a$, 97$a$ and 98$a$. A conductor 133$a$ interconnects a terminal 167$a$ to a movable contact 108$a$ of the switch 98$a$. Also, a conductor 141$a$ connects a terminal 168$a$ to a fixed contact 121$a$ of the switch 98$a$, a conductor 144$a$ connects a terminal 169$a$ to a fixed contact 117$a$ of the switch 94$a$, a conductor 142$a$ connects a terminal 171$a$ to a fixed contact 119$a$ of the switch 97$a$, a conductor 138$a$ interconnects a fixed contact 111$a$ of the switch 94$a$ and a movable contact 103$a$ of the switch 93$a$, and a conductor 134$a$ interconnects a fixed contact 114$a$ of switch 98$a$ and a movable contact 107$a$ of the switch 97$a$.

In addition to the fact that the controller or handle 153 has only four switches, its circuits differ from that in the handle 91 in that a fixed contact 113$a$ of switch 97$a$ is connected by a conductor 187 to a movable contact 104$a$ of the switch 94$a$. Furthermore, terminals 173$a$ and 178$a$ are interconnected by a conductor 188, and the terminals 174$a$ and 176$a$ are interconnected by a conductor 189 and are connected to a fixed contact 109$a$ of switch 93$a$ by a conductor 191. The terminal 177$a$ is open. From the foregoing circuit it can be seen that the control handle 153 provides control of the head and foot portions of the drive unit but does not provide control of the bed mechanism since handle 153 does not include switches for controlling the relays having coils 126 and 129. However, the bed mechanism can be controlled by operation of the toggle switch 149. Thus, when the handle 153 is substituted for the handle 91, the toggle switch 149 is moved to the open position shown by dotted lines in FIG. 1. If it is desired that the bed be raised, the toggle switch 149 can be shifted to the position shown in full lines in FIG. 1 and this will energize the relay coil 129 by connecting it to the positive side of the power source 123, through the conductor 148. Likewise, if it is desired to lower the hospital bed, the toggle switch 149 can be shifted to close the circuit, through the fixed contact 184 and coil 126, to the positive side of the power source 123. Thus, even though the controller or handle 153 denies a patient in the bed control of the bed level, the level can be changed by a nurse or the like, using the toggle switch 149.

To illustrate how the system operates, the operation of one control segment, when the controller device or handle 91 is attached, will be described fully. The other control segments operate in practically the same manner and their mode of operation will be evident from the description of the one.

If it is desired to raise the head of the bed, the switch 94 in the handle 91 is manipulated to shift its movable contact 104 from the position shown in FIG. 1 to a position engaging the fixed contact 117. This closes the circuit through relay coil 132 and opens the connection to switches 92 and 93. (It is assumed that the toggle switch 152 is closed.) Thus, the relay coil 132 is energized by having one end connected to the positive side of the power source 123 through the toggle switch 152 and the conductor 148 and by having its other end connected to the negative side of the power source 123 through the connector terminals 157 and 169, the conductor 144, the fixed contact 117, movable contact 104, conductor 137, fixed contact 112, movable contact 106, conductor 136, fixed contact 113, movable contact 107, conductor 134, fixed contact 114, movable contact 108, conductor 133 and connector terminals 154 and 167.

Energization of the relay coil 132 in the control circuit closes the relay switch 72 in the main circuit. Upon closure of the switch 72, the solenoid coil 20 and the relay coil 42 are connected across their power source, the auto transformer 76. Thus, one end of the solenoid coil 20 is connected by the conductor 82 to the negative terminal of the rectifier 77 and the opposite end of the solenoid coil 20 is connected to the positive terminal through the normally closed limit switch 89, the relay switch 72, the conductor 73, the relay coil 42, the conductor 74 and the conductor 81. Energization of the solenoid coil 20 actuates its associated clutch to engage the head operating mechanism with the motor 21. Simultaneously, energization of the relay coil 42 moves its associated movable contact 43 into engagement with its fixed contact 44.

The closure of the movable contact 43 on the fixed contact 44 connects the motor winding 22 as the main or running winding and connects the motor winding 23 in series with the centrifugal switch 29, resistor 30 and the capacitor 28 as the starting winding. Thus, the conductor 48 is connected to the motor terminal through the overload protector 47 and the conductor 46. The motor terminal 26 is connected to the conductor 49 through the conductor 54, the conductor 53, the movable conductor 43, the fixed contact 44, the conductor 51, the fixed contact 36, and the movable contact 34. As the motor begins to rotate in the forward or up direction, the rotation sensing switch 58 shifts its movable contact 62 into engagement with its fixed contact 61 to prepare the motor for instant reversal, if such becomes desirable. After the motor attains running speed, the centrifugal switch 29 opens and disconnects the starting winding 23.

The motor 21 will continue to operate in the forward or up direction until the switch 94 opens or until the head elevation mechanism has operated to its predetermined limit thus opening the limit switch 89. Opening of the manual switch 94 or the limit switch 89 immediately de-energizes the solenoid coil 20 and the relay coil 42 so that the motor is stopped and the clutch actuated to disengage.

If it is desired to operate the head elevating mechanism in the down direction, the switch 98, instead of the switch 94, is manipulated to close its movable contact 108 on its fixed contact 121. One end of the relay coil 128 being connected to the positive terminal of the power source 123 through the conductor 148 and the toggle switch 152, the opposite end of the relay coil 128 is connected to the negative terminal of the power source 123 through the connector terminals 156 and 168, the conductor 141, the fixed contact 121, the movable contact 108, the conductor 133 and the connector terminals 167 and 154. Energization of the relay coil 128 closes the relay switch 67 and this, in turn, connects the solenoid coil 20 and the relay coil 33 across the terminals of the rectifier 77. In this situation, one end of the coil 20 is connected to the negative terminal of the rectifier 77 by the conductor 82. The opposite end of the solenoid coil 20 is connected to the positive terminal through the normally closed limit switch 86, the relay switch 67, the conductor 68, the relay coil 33 and the conductor 81.

Energization of the solenoid coil 20, of course, actuates the clutch to engage the head elevating mechanism with the motor 21. Simultaneously therewith, the energization of relay coil 33 shifts the movable contacts 34 and 38 into engagement with their fixed contacts 37 and 41 respectively. Engagement of the movable contact 34 with the fixed contact 37 connects the winding 23 across the line as the running winding and connects the motor winding 22 in series with the centrifugal switch 29, the resistor 30 and the capacitor 28 as the starting winding through the terminal 27, the conductor 52, the fixed contact 37 and the movable contact 34. As the motor begins to operate in the reverse or down direction, the rotation sensing switch 58 switches its movable contact 62 into engagement with its fixed contact 57 to prepare the motor for instant reversal if such be desired. After the motor has attained running speed, the centrifugal switch 29 opens and disconnects the starting winding 22.

Should it be desired to instantly change from one direction of operation to the other, such as from the down direction of operation to the up direction of operation, or vice versa, the present system will immediately accomplish this result. For example, if during operation the operator had decided that he had lowered the head of the bed too much, he can simply release the movable contact 108 of switch 98 from its fixed contact 121 and without hesitation engage the movable contact 104 of the switch 94 with its fixed contact 117. This de-energizes the relay coil 128, causing it to open its associated relay switch 67 and energizes the relay coil 132, causing it to close its associated relay switch 72. In effect, the solenoid coil 20 remains energized, but the relay coil 33 is de-energized and the relay coil 42 becomes energized. Hence, the clutch associated with the solenoid coil 20 remains in engagement, but the movable contacts 34 and 38 move into engagement with fixed contacts 36 and 39 respectively and the movable contact 43 engages the fixed contact 44.

The foregoing movement of the movable contacts 34, 38 and 43 reconnects the windings 22 and 23 as the main and starting windings respectively, notwithstanding the fact that the centrifugal switch 29 is open. Thus, the running winding 22 is connected directly across the line in the manner described above. The motor winding 23 is connected across the line as the starting winding in series with the capacitor 28 and the resistor 30 through the shunt path around the open centrifugal switch 29 provided by the conductor 63, the movable contact 62 and the fixed contact 57 of the rotation sensing switch, the conductor 56, the fixed contact 39, the movable contact 38, the conductor 53, the movable contact 43, the fixed contact 44, the conductor 51, the fixed contact 36, and the movable contact 34. A reverse torque is immediately developed in the motor 21, bringing it to a fast stop. As the motor slows down the centrifugal switch 29 closes, and as the motor starts in the opposite or up direction, the movable contact 62 of the rotation sensing switch 58 shifts into engagement with the fixed contact 61, thus preparing the motor for another instant reversal. It should be noted that this instantly reversing feature is also used when an operator changes direction of operation and also shifts from one segment of the control, such as the foot operating segment, to another segment of the control such as the head or bed operating segment.

The controllers or handles 91 and 153 embody other important features. From the standpoint of physical makeup, such handles are light weight and easily manipulated. Moreover they are safe for use in atmospheres that present a combustion problem and are adapted for sterilization by being immersed in a liquid bath or the like. In addition, they have relatively few parts that are easily and conveniently manufactured.

FIGS. 3, 4 and 5 illustrate a preferred form of the six switch controller or handle 91. This form of the controller or handle 91 comprises a generally rectangular switch assembly 192 (see FIGS. 4 and 8), which will be discussed more fully hereinafter, that is mounted in a generally rectangular casing or housing 193. The housing 193 is formed for insulating material, preferably of an inert, rigid, plastic material. The front of the housing 193 is provided with a rectangular recess 194 (see FIG. 4) in which the switch assembly 192 is mounted. At its lower end, as seen in FIGS. 3, 4 and 5, the casing 193 is provided with an integral neck portion 196 having a bore or opening 197 through which the cable 198 is inserted. The cable 198 contains the portions of the conductors 133, 141, 144, 142, 146, 182, 143 and 147 that are connected to the terminals of the male connector part described above. After the cable 198 has been mounted in the opening 197 it is cemented in place, thereby sealing it to the neck portion 196. The switch assembly is, of course, mounted in the casing recess 194 and is rigidly held therein by a screw 199 that projects through an opening 201 in the back of casing 193 and is threaded into the assembly 192 (see FIG. 4). A plug 202, overlying the screw 199, closes the opening 201 and is cemented in place.

The front of the switch assembly 192 is covered by a thin walled boot 203 of transparent, flexible material which, in effect, forms the front wall of the casing 193. The boot 203 extends around the sides of the switch assembly 192 and has an in-turned peripheral flange 204 that extends around the back edge of the switch assembly. The boot also has a front peripheral flange 206 that is turned outwardly. When the switch assembly is mounted in the casing 193, the flange 204 seats against a shoulder 207 formed on the casing 193 in the recess 194, and is compressed thereagainst to act as a gasket. The casing 193 also has a plurality of spaced forwardly projecting pins 208 to provide additional support for the switch assembly 192. Cement is also used to seal the flange 204 to the shoulder 207 and to seal the flange 206 to the front edge of the casing. Thus, the controller or handle is completely sealed and can be easily sterilized.

As is shown in FIG. 3, the switch assembly 192 is provided with six push-buttons 209, 211, 212, 213, 214 and 216. These push-buttons operate the six switches 94, 93, 93, 97, 92 and 96, respectively, as will be more fully described hereafter. These push-buttons have on their faces indicia showing the bed functions they control. The transparent character of the boot 203 permits an operator to see these indicia and the boot 203, being resiliently flexible, permits the operator to manipulate any of the push-buttons by pressing on the face of the boot.

FIGS. 6 and 7 show a second form of the controller or handle 91. This form differs from the preceding form principally in the construction of its outer casing 217. In this instance, the casing 217 is of flexible material, such as rubber, and is formed to have a rectangular recess 218 with an opening 220 at the top of the casing, as seen in FIGS. 6 and 7. Mounted in the recess 218 is the switch assembly 192, the boot 203 having been eliminated, with its push-buttons 209, 211, 212, 213, 214 and 216 facing a thin front wall 219 of the casing. Inasmuch as the casing 217 is of rubber, the front wall 219 is opaque. Consequently, the front wall 219 is provided with a covering 220a, having indicia such as shown in FIG. 6, printed on its face to indicate to an operator where to press to actuate the various switches in the controller. After the switch assembly has been mounted in the casing 217, the open end 220 of the recess 218, as seen in FIG. 7, is closed by a rubber plug 223. The plug 223 is sealed to the casing by cement.

FIGS. 9, 10, 11 and 12 show a preferred form of the switch assembly 192, a form which can be used with either of the two casings above described. The switch assembly 192 comprises a base member 224, a cover member 226, a plurality of movable contact arms and a corresponding plurality of push-buttons for actuating the arms.

The base member 224 is a flat rectangular element of insulating material and has on its inner face a printed circuit that provides the various fixed contacts for the manual switches in controller or handle 91, diagrammatically shown in FIG. 1. The printed circuit is illustrated in FIG. 10 and portions thereof have been given the reference numbers of their corresponding elements in the circuit of FIG. 1. It can be seen in FIG. 10, that the printed circuit is arranged so that at each switch location there are grouped three enlarged conducting areas located in aligned space relation for cooperation with an associated movable contact element, the latter being shown in dotted lines in FIG. 10. The two end enlarged areas of each group form the fixed switch contacts, while the intermediate area is continuously engaged by the associated movable contact and, thus, forms a terminal for the associated movable contact. This relationship is clearly illustrated in FIG. 11, which shows the physical arrangement of the manual switch 94. The printed circuit also provides portions of the control circuit that are shown in FIG. 1 as being in the handle. Such portions of the control circuit are connected to conductors in the cable 198 in the usual manner as by soldering.

The cover member 226 of the switch assembly is generally rectangular and has a peripheral rim 227 (see FIG. 12) that seats against the peripheral edge of the base member 224 and is preferably cemented to the base member. The cover member 226 is provided with six openings, such as the opening 228 shown in FIG. 11, formed to receive the push-buttons for actuating the switches. Preferably the member 226 is molded of a plastic insulating material. As shown in FIGS. 11 and 12, the portion of the cover member 226 inwardly of the rim 227 is spaced away from the base member 224.

The push-buttons, such as 209 shown in FIGS. 11 and 12, are formed so that they slide relative to the cover member 226 toward and away from the base member 224. When the push-buttons are located at their outermost position with respect to the base member 224, their outer surfaces are substantially flush with the face of the cover member 226. Each of the push-buttons is provided with four radially extending lugs 229, that engage in pockets 231 provided in the cover member 226, thereby preventing the push-buttons from rotating with respect to the cover member 226. The lugs 229 also act as stops for limiting the outward movement of the push-buttons with respect to the cover member 226.

The push-buttons, of course, actuate the movable contacts of their associated switches. FIGS. 11 and 12 show the push-button 209 and how it cooperates with the movable contact 104. As shown in FIGS. 9 and 11, the movable contact 104 is an elongated metal arm having dimples, such as 231 and 232, at its opposite ends facing the contacts 111 and 117. Intermediate its ends, and closer to the dimple 232, the arm or movable contact 104 is bent, as at 233, to form a fulcrum. The fulcrum 233 continuously bears against an enlarged area 137a in the conductor 137, and permits the movable contact 104 to rock. Rocking the contact arm 104 in one direction causes the dimple 232 to engage the fixed contact 111 and rocking the contact arm in the opposite direction causes the dimple 231 to engage the fixed contact 117. The movable contact 104 is normally urged to rock in the one direction by a coil spring 234, one end of which bears against the movable contact 104 intermediate the dimple 232 and the fulcrum 233 and the other end of which is disposed in a hole or depression 236 in the cover member 226.

To rock the member 104, the push-button 209 has a button portion 236 that bears against the upper surface of the member 104 intermediate its dimple 231 and fulcrum 233. Thus, when the push-button 209 is depressed, the member 104 is forced to rock or rotate in the clockwise direction as seen in FIG. 11. This compresses the spring 234, disengages the dimple 232 from the fixed contact 108 and engages the dimple 231 with the fixed contact 117. When the push-button 209 is released, the compressed spring 234 forces the movable contact to rock or rotate in counterclockwise direction, as seen in FIG. 11, thus disengaging the dimple 231 from the fixed contact 117, engaging the dimple 232 with the fixed contact 108 and forcing the push-button 209 outwardly with respect to the cover member 226.

It should be noted that the use of a printed circuit to form the fixed switch contacts and the circuit connections inside the handle 91, permits the switch assembly 192 to be small, thin, and lightweight. The same structure is readily adaptable for use in the four button controller or handle 153, by merely eliminating two push-buttons and their associated movable contacts and by slight modifications in the printed circuit. Clearly, many of these features can be used in switch assemblies having any number of switches.

From the foregoing description and the drawings, it is apparent that the present invention provides a novel control system that is well adapted for use in conjunction with a hospital bed drive unit. The system is safe and dependable. It can be easily operated by a patient and after use by one patient, the controller or handle can be easily sterilized before use by another. Moreover, the system can be easily changed to suit the needs of each patient, either by substituting interchangeable handles or by operating switches that are located out of the reach of the patient, or both.

Although the invention has been described in connection with specific structural embodiments thereof, it is

I claim:

1. A control system for a drive unit including a reversible electric motor and its power circuit, a driven shaft connectable to a mechanism to be driven by said motor, and clutch means for selectively interconnecting and disconnecting said shaft and said motor, said control system comprising a low power control circuit having manual switch means connected therein with at least a portion of said circuit adapted to be located at a position remote from said drive unit, a main circuit comprising electrically operated means for selectively connecting said power circuit of said motor for forward and reverse operation of said motor, and electrically operated clutch actuator means for effecting engagement and disengagement of said clutch means, and sensitive means connected in said control circuit and responsive to operation of said manual switch means and connected in said main circuit to effect energization of said clutch actuator means and said motor connecting means in response to operation of said manual switch means, said control circuit being operable on power sufficiently low to be substantially non-arcing at said manual switch means upon opening and closing thereof.

2. A control system for a drive unit including a reversible electric motor and its power circuit, a driven shaft connectable to a mechanism to be driven by said motor, and clutch means for selectively interconnecting and disconnecting said shaft and said motor, said control system comprising a low power control circuit having a pair of manual switches connected therein, said switches being adapted to be located remotely from said unit, one switch of said pair being a forward switch and the other being a reverse switch, a main circuit comprising electrically operated means for selectively connecting said power circuit of said motor for forward and reverse operation of said motor, and an electrically operated clutch actuator for effecting engagement and disengagement of said clutch means, and sensitive means connected in said control circuit and responsive to the operation of said manual switches and connected in said main circuit for effecting energization of said clutch actuator means in response to operation of either of said manual switches and for simultaneously effecting energization of said motor connecting means to cause forward operation of the motor upon operation of the forward switch and to cause reverse operation of the motor upon operation of the reverse switch, said control circuit being operable on power sufficiently low to be substantially non-arcing at said manual switches upon opening and closing thereof.

3. A control system according to claim 1, in which said clutch actuator means, said motor connecting means and said sensitive means are mounted in a housing adjacent the motor, and at least a portion of said manual switch means is mounted in a portable controller handle adapted to be located remotely from said housing.

4. A control system according to claim 1, in which said sensitive means comprises a pair of devices and said manual switch means comprises a pair of switches respectively connected to said devices, both devices being connected to effect energization of clutch actuator means in response to operation of either manual switch, one device cooperating with said motor connecting means to connect said motor for forward operation upon operation of its associated switch, and the other device cooperating with said motor connecting means to connect said motor for reverse operation of the motor upon operation of its associated switch.

5. A control system according to claim 4, in which said devices are a pair of relays, each relay having a set of contacts and a sensitive actuating coil, the coils of said relays being respectively connected in series with their associated manual switches in said control circuit, and the sets of relay contacts being connected in said main circuit to control the energization of said actuator means and said controlling means.

6. A control system according to claim 1, in which said control circuit comprises a first circuit portion located at the drive unit, a first portable controller, a second circuit portion located in said first portable controller and detachably connected to said first portion by a single connector device comprising a pair of separable connector parts and a cable containing a plurality of conductors, one of said parts being attached to said cable and the other part being attached to said first portion.

7. A control system according to claim 6, including a second portable controller provided with a connector part identical to that attached to said cable and with another circuit portion different from said second circuit portion, said other circuit portion being connected to said first circuit when said second controller is substituted for said first controller.

8. A control system for a drive unit including a reversible electric motor and its power circuit, a driven shaft connectable to a mechanism for driving the same, and clutch means for selectively interconnecting and disconnecting said shaft and said motor, said control system comprising a main circuit having electrically operated means for selectively connecting said power circuit of said motor for forward and reverse operation of said motor and an electrically operated clutch actuator operable to actuate said clutch means to interconnect and disconnect said motor and said shaft, a control circuit having connected therein a pair of manual switches adapted to be located remotely from said drive unit, one manual switch being a forward switch and the other manual switch being a reverse switch, means for isolating said control circuit from said main circuit, said isolating means having portions connected in said control circuit and responsive to the opening and closing of said manual switches and having other portions connected in said main circuit to effect operation of said clutch actuator and said connecting means upon closing and opening of said manual switches, said isolating means permitting use of low current and voltage in said control circuit to prevent arcing upon opening and closing of said manual switches.

9. A control according to claim 8, in which said main circuit operates on higher power than said control circuit, said isolating means comprising a pair of sensitive relays operable by a current flow in said control circuit that is weak enough to be substantially non-arcing at said manual switches upon closing and opening thereof.

10. A control system for a drive unit including a reversible electric motor and its power circuit, a plurality of driven shafts individually connectable to mechanisms for driving the same, clutch means for selectively interconnecting and disconnecting said shafts and said motor, said control system comprising a main circuit having electrically operated means for selectively connecting said power circuit of said motor for forward and reverse operation and a plurality of electrically operated clutch actuators respectively associated with said shafts, each actuator being operable to actuate said clutch means to interconnect and disconnect said motor and the associated shaft, a control circuit having a plurality of manual switches connected therein and arranged in pairs, said pairs of switches being associated with said motor connecting means and respectively associated with said clutch actuators, and a pair of isolating devices associated with each pair of manual switches, each isolating device having a portion connected in said control circuit and responsive to the opening and closing of its associated manual switch and having another portion connected in said main circuit for effecting operation of the associated clutch actuator and of said motor connecting means upon closing and opening of its associated manual switch.

11. A control system according to claim 10, in which said pairs of switches are mounted within a portable casing, said switches being electrically interlocked by circuit connections within said casing to permit energization of no more than one of said clutch actuators at one time.

12. A control system according to claim 11, in which said casing contains a printed circuit member providing fixed contacts for said switches and providing said electrical interlock circuit connections of said control circuit.

13. A control system according to claim 10, in which said clutch means comprises three clutches and said main circuit has three clutch actuators, said control circuit having three pairs of manual switches respectively associated with said three clutch actuators.

14. A control system according to claim 13, in which a portion of said control system including said clutch actuators, said motor connecting means and said isolating devices is mounted in a housing enclosing the motor and the clutches, and another portion of said control system including at least two of the three pairs of manual switches is mounted in a portable controller casing and operatively connected to said one portion by a flexible cable containing a plurality of conductors.

15. A control system according to claim 14, in which all three of said pairs of switches are mounted in said controller casing.

16. A control system for a drive unit including an electric motor and clutch means for connecting the motor to a selected one of a plurality of driven mechanisms, said control system comprising a housing containing a main circuit including electrically operated apparatus for connecting and disconnecting said motor and for selectively actuating said clutch means, a set of interchangeable but different controller handles both having associated identical connector parts each having a plurality of terminals and each handle having a plurality of manually operable switches connected in circuit with the associated connector part, a mating connector part mounted on said housing for attachment to either of said identical connector parts, and means located in said housing and connected between said mating connector part and said apparatus and responsive to operation of said manual switches in either handle when attached for effecting operation of said apparatus upon opening and closing of the manual switches, the respective handles of said set having different circuit arrangements to provide different controls.

17. A control system according to claim 16, in which said handles are also different in that they have different numbers of manual switches.

18. A control system according to claim 16, in which said motor is reversible and said apparatus is operable to selectively connect the motor for forward and reverse operation, said manual switches in both handles being arranged in pairs and the circuit connections being such that manipulation of one switch of any pair in the attached handle actuates said apparatus to effect forward operation of the motor and manipulation of the other switch of said pair actuates said apparatus to effect reverse operation of the motor.

19. A control system according to claim 18, in which said apparatus includes a plurality of clutch actuators, said circuit arrangement being such that said pairs of switches are respectively associated with said clutch actuators and manipulation of either switch in a pair will effect actuation of the associated clutch actuator.

20. A control system for a drive unit including an electric motor and clutch means for connecting the motor to a selected one of a plurality of driven mechanisms, said control system comprising a housing, a main circuit located in said housing and including electrically operated apparatus for connecting and disconnecting said motor and for selectively actuating said clutch means, a control circuit having a first portion located in said housing and connected to a connector part mounted on said housing and having a plurality of terminals, a first controller provided with another portion of said control circuit including a plurality of manual switches connectable in circuit with said first portion by another connector part adapted to mate with said first connector part, means located in said housing and responsive to the operation of said manual switches when said connector parts are interengaged for effecting operation of said control apparatus upon opening and closing of the manual switches, and a second controller provided with a different form of control circuit portion connected to a connector part adapted to mate with said first connector part, whereby said controllers may be freely interchanged to provide different controls.

21. A control system according to claim 20, in which said control circuit portions include at least one circuit connection that is used when one controller is connected in the control circuit and is not used when the other controller is connected in the control circuit.

22. In a control system having a plurality of terminals connected to a plurality of circuit elements and normally having a controller having a plurality of switches and conductors detachably connected to said terminals for energizing the respective circuit elements, a substitute controller adapted to be substituted for the first mentioned controller and having different conductors and a different number of switches, the conductors and switches of said substitute controller being adapted to be detachably connected to certain of said terminals for energizing certain of said circuit elements.

23. A control system for use with the substitute controller of claim 22, said control system including a manually operable switch for energizing circuit elements not energized by the switches of said substitute controller.

24. A portable control handle for an electrically operated device, comprising casing means of insulating material and including an exposed thin flexible wall, a switch assembly mounted within said casing, said assembly comprising a flat member providing a plurality of fixed contacts, a plurality of movable contacts located between said flexible wall and said member and in overlying relation to said fixed contacts to define a plurality of switches underlying said thin wall, whereby said switches can be manually manipulated by pressure exerted on said wall, and insulated liquid-proof conductor means connected to said switch assembly and extending from and sealed to said casing, said casing being liquid tight, whereby said handle can be sterilized by immersion in a liquid sterilizing bath.

25. A control according to claim 24, in which each switch includes a pushbutton for operating the movable contact thereof, said thin wall overlying all of said pushbuttons.

26. A control handle according to claim 24, in which said assembly includes a plurality of rockable elongated arms located in overlying relation to said fixed contacts and providing said movable contacts for engagement respectively with said fixed contacts.

27. A control handle according to claim 26, in which each end of each arm constitutes a movable contact, said fixed contacts being arranged in pairs in spaced relation to respectively cooperate with the movable contacts of their respective arms, each arm having a fulcrum located intermediate its end, whereby each arm can be selectively rocked to engage either of its associated fixed contacts.

28. A control handle according to claim 26, in which each arm has an integral fulcrum intermediate its ends, said fulcrum bearing against said member to permit said arm to be rocked into and out of engagement with an associated fixed contact.

29. A control handle according to claim 28, in which said member has a plurality of conductors thereon, and each arm including its fulcrum is of conducting material, and the fulcrum of each arm bears against one of said conductors.

30. A control handle according to claim 28, in which each arm is a sheetmetal strip and has a bend intermediate its ends to provide said fulcrum.

31. A control handle according to claim 26, in which said flat member has a printed circuit thereon providing said fixed contacts and also providing interconnecting conductors.

32. A control handle according to claim 24, in which said flat member has a printed circuit thereon providing said plurality of spaced fixed switch contacts, a support member rigidly overlying said printed circuit, a plurality of pushbuttons mounted in spaced relation in said support member, said pushbuttons being movable relative to said support member and toward and away from said printed circuit, and a movable contact for each pushbutton, each movable contact being disposed between its associated pushbutton and an associated fixed contact provided by said printed circuit for operative engagement with said fixed contact.

33. A control handle according to claim 32, in which said support member has a flat face provided with a plurality of spaced pushbutton apertures, said pushbuttons respectively projecting outwardly through said apertures.

34. A control handle according to claim 30, in which said assembly includes a plurality of elongated contact arms respectively engaging said pushbuttons and providing said movable contacts, and means for urging said arms in a direction to force said pushbuttons outwardly relative to said support member.

35. A control handle according to claim 34, in which each pushbutton has means on its inner face for holding its associated contact arm against lateral shifting.

36. A control handle according to claim 34, in which said support member and said pushbuttons have interengaging portions for limiting outward movement of said pushbuttons and for preventing rotation of said pushbuttons relative to said support member.

37. A control handle according to claim 24, in which said casing means comprises a rigid cup-shaped part and a thin walled flexible boot, said boot being disposed around said switch assembly to form a cover therefor, said boot and said assembly being disposed in said part with said boot exposed, said boot being sealed at its periphery to said cup-shaped part.

38. A control handle according to claim 37, in which said boot is of transparent material permitting said switch assembly to be viewed therethrough.

References Cited in the file of this patent

UNITED STATES PATENTS

| | | |
|---|---|---|
| 2,616,994 | Luhn | Nov. 4, 1952 |
| 2,695,086 | Parker | Nov. 23, 1954 |
| 2,750,480 | Freeman | June 12, 1956 |
| 2,778,957 | Fuchs | Jan. 22, 1957 |
| 2,838,622 | Bachi | June 10, 1958 |
| 2,912,704 | Burst | Nov. 17, 1959 |